(12) United States Patent
Hammerstrom

(10) Patent No.: US 8,590,802 B2
(45) Date of Patent: Nov. 26, 2013

(54) WATER HEATER CONTROL MODULE

(75) Inventor: Donald J. Hammerstrom, West Richland, WA (US)

(73) Assignee: Battelle Memorial Institute, Richland, WA (US)

(*) Notice: Subject to any disclaimer, the term of this patent is extended or adjusted under 35 U.S.C. 154(b) by 790 days.

(21) Appl. No.: 12/641,206

(22) Filed: Dec. 17, 2009

(65) Prior Publication Data

US 2011/0147473 A1 Jun. 23, 2011

(51) Int. Cl.
*G05D 23/00* (2006.01)
*H05B 1/00* (2006.01)
*H05B 1/02* (2006.01)

(52) U.S. Cl.
USPC ............................. 236/51; 219/209; 219/490

(58) Field of Classification Search
USPC ............ 236/51, 20 R, 47; 219/209, 490, 491, 219/506
See application file for complete search history.

(56) References Cited

U.S. PATENT DOCUMENTS

| | | | | |
|---|---|---|---|---|
| 5,968,393 | A * | 10/1999 | Demaline | 219/492 |
| 2007/0132249 | A1 | 6/2007 | Andrew et al. | |
| 2007/0162689 | A1 | 7/2007 | Choi | |
| 2007/0220907 | A1* | 9/2007 | Ehlers | 62/126 |
| 2007/0290507 | A1 | 12/2007 | Andrew et al. | |
| 2011/0083443 | A1 | 4/2011 | Jockenhoevel et al. | |
| 2011/0147360 | A1 | 6/2011 | Hammerstrom | |

FOREIGN PATENT DOCUMENTS

| | | |
|---|---|---|
| EP | 2101051 | 9/2009 |
| WO | PCT/US2011/040393 | 8/2012 |
| WO | PCT/US2011/040393 | 4/2013 |

OTHER PUBLICATIONS

DeSteese et al. "Resource Form Factor and Installation of GFA Controllers."; Technical Report. Pacific Northwest National Laboratory, Richland, WA.; Nov. 2009; 22 pp.
Energy Information Administration Official Energy Statistics from the U.S. Government Consumption & Expenditures Data Tables; EIA. 2001; 4 pp; "http://www.eia.doe.gov/emeu/recs/recs2001_ce/ce4-12c_westregion2001.html".
Hammerstrom, DJ; Final Letter Report: Grid-Responsive Demand-Side Control Using Grid Friendly Appliance Technologies; PNNL-18997, Pacific Northwest National Laboratory, Richland, WA; Nov. 2009, 22 pages.
Hammerstrom et al., Pacific Northwest GridWise™ Testbed Demonstration Projects; Part II. Grid Friendly™ Appliance Project; PNNL17079; http://gridwise.pnl.gov. Oct. 2007; 123 pp.
Lu et al., "Design Considerations for Frequency Responsive Grid Friendly™ Appliances", IEEE 2005 Power Engineering Society TD 2005/2006; pp. 647-652; May 21-24, 2006.
Lu et al., "Grid Friendly™ Device Model Development and Simulation", Technical Report. Pacific Northwest National Laboratory, Richland, WA.; Nov. 2009; 52 pp.

* cited by examiner

*Primary Examiner* — Chen Wen Jiang
(74) *Attorney, Agent, or Firm* — Wells St. John P.S.

(57) ABSTRACT

An advanced electric water heater control system that interfaces with a high temperature cut-off thermostat and an upper regulating thermostat. The system includes a control module that is electrically connected to the high-temperature cut-off thermostat and the upper regulating thermostat. The control module includes a switch to open or close the high-temperature cut-off thermostat and the upper regulating thermostat. The control module further includes circuitry configured to control said switch in response to a signal selected from the group of an autonomous signal, a communicated signal, and combinations thereof.

11 Claims, 3 Drawing Sheets

WATER HEATER CONTROL MODULE

The invention was made with Government support under Contract DE-AC0676RLO 1830, awarded by the U.S. Department of Energy. The Government has certain rights in the invention.

TECHNICAL FIELD

This invention relates to smart grid appliances. More specifically, the invention relates to an advanced electric water heater control system that allows a water heater to operate in a manner that optimizes the consumption of electrical power.

BACKGROUND OF THE INVENTION

At least one definition of a "smart grid" describes a "smart grid" as a method for delivering electricity from suppliers to consumers using digital technology to control appliances at consumer's homes to save energy, reduce cost and increase reliability and transparency. Such a modernized electricity network is being promoted by many governments as a way of addressing energy independence, global warming and emergency resilience issues.

In one configuration, a "smart grid" operates by having devices that plug into an outlet, and in turn plugging appliances into this device. The device would then communicate and report to the electric companies at what time the appliance used energy and how much and use that to charge more for electricity used during peak hours of late afternoon and early evening. The electric company could offset that increase in price by giving discounts during the low demand hours (generally between midnight and 5 am).

One drawback of this approach is the cost of the device. Another drawback is that many appliances are not readily connected to such a device. Yet another drawback of this approach is that it fails to account for considerations other than the spot price of electricity. Yet another drawback is that many appliances, such as a hot water heater, operate independently using regulators, such as a thermostat. The present invention overcomes these and other drawbacks.

SUMMARY OF THE INVENTION

The present invention is an advanced electric water heater control system. The advanced system of the present invention includes components that are common to existing water heater thermostats. Thus, the present invention includes a high temperature cut-off thermostat and upper regulatory thermostat. As is typical, the high temperature cut-off thermostat has a first and a second AC power input and a first and a second AC power output. The upper regulating thermostat has an AC power input and AC power outputs controlling the current to at least one resistive element in the electric water heater.

The present invention further provides a control module. The control module is electrically connected to the first AC power output of the high-temperature cut-off thermostat, the second AC power output of the high temperature cut-off thermostat, and the AC power input of the upper regulating thermostat.

The control module includes a switch to open or close the electrical connection between the first AC power output of the high-temperature cut-off thermostat and the AC power input of the upper regulating thermostat. The control module further includes circuitry that is configured to control the switch. The circuitry is configured to open or close the switch in response to signals that are received by the control module. These signals may be autonomous signals, communicated signals, and combinations thereof.

While not meant to be limiting, the advanced electric water heater controller system of the present invention provides a particular advantage wherein the control module is a retrofit component that is connected to the high temperature cut-off and upper regulating thermostat of the existing thermostat of an electric water heater. This type of configuration allows an existing water heater to be retrofitted by adding the control module, thereby transforming the existing water heater thermostat into an advanced system.

While not meant to be limiting, this configuration is easily accomplished by positioning the corresponding three connections of the control module to align with corresponding connections of the high temperature cut-off and upper regulating thermostats and completing the electrical connections to each using the existing screw terminals of the thermostat connections. In this manner, connections are formed between the control module and the first AC power output of the high-temperature cut-off thermostat, the control module and the second AC power output of the high temperature cut-off thermostat, and the control module and the AC power input of the upper regulating thermostat of the existing thermostat.

While the present invention includes retrofitted configurations as just described, the present invention also includes non-retrofitted configurations wherein the control module is integrated with the high temperature cut-off and upper regulating thermostat as a unified component. While not meant to be limiting, these integrated configurations typically would be supplied in new water heaters.

The advanced electric water heater controller system of the present invention may further provide the switch as a hybrid relay. Preferably, but not meant to be limiting, the hybrid relay has an electromechanical relay and a semiconductor switch that are electrically in parallel. In such a configuration, the semiconductor switch may be configured to close the connection prior to the electromechanical relay, and the electromechanical relay may be configured to open the connection prior to the semiconductor switch. In this manner, the advanced electric water heater controller system of the present invention allows for rapid, frequent, and energy efficient switching to maximize the advantages of the advanced controller system while preserving the longevity of the electrical components, such as the electromechanical relay.

The circuitry of the advanced electric water heater controller system of the present invention is preferably configured to allow the communicated signal to override the current status of the switch. Thus, for example and not meant to be limiting, when the switch is positioned such that the resistive heating elements are actively consuming electrical power, a communicated signal indicating that the electrical grid would benefit from a reduction in the consumption of power could cause the switch to change, thus turning the consumption of power off.

The control module of the advanced electric water heater controller system of the present invention preferably includes circuitry that electrically isolates the communicated signal from the first and second AC power inputs. The circuitry that controls the communications functions of the control module are operated at relatively low voltages. By electrically isolating these circuits from the first and second AC power inputs, these circuits are protected from exposure to, and potential damage by, the relatively high voltages of the first and second AC power inputs.

The advanced electric water heater controller system of the present invention preferably includes at least one additional electronic thermostat that measures the temperature of water in at least one location in the electric water heater. In this manner, the temperature of the water is an input that the control module can take into consideration. The circuitry of the control module is thus configured to control the switch in response to an autonomous signal, communicated signal, or a combination thereof, and may further be configured to be modified by the actual water temperature as measured by the electric thermostat.

Preferably, the control module of the present invention contains circuitry that is configured to control the switch using predetermined protocols. These predetermined protocols are further configured to respond to communicated signals and the autonomous signals received by the control module. In this manner, the control module allows the optimum operation of the water heater in response to a wide variety of potential considerations. For example, and not meant to be limiting, potential considerations that could govern the operation of the water heater include the temperature of the water, the time of day, the electrical demand in the building where the water heater is located, the demands that are placed on the electrical power grid external to the building where the water heater is located, the price of electricity at a given moment in time, building occupancy, or renewable resource availability.

To take advantage of all of these possible considerations, the circuitry of the control module of the present invention is configured to respond to communicated and autonomous signals that include, but are not limited to, sensing the electrical power grid voltage, sensing the electrical power grid frequency, and combinations thereof. The circuitry of the control module is thus able to optimize the operation of the water heater to accommodate a wide variety of considerations, including but not limited to the needs of the people who are using the hot water from the hot water heater, the electrical utilities that are supplying power on the grid connected to the hot water heater, the engineers who are responsible for providing power distribution through the grid, and other users who are also consuming power from the grid.

BRIEF DESCRIPTION OF THE DRAWINGS

The following detailed description of the embodiments of the invention will be more readily understood when taken in conjunction with the following drawings, wherein.

DETAILED DESCRIPTION OF THE PREFERRED EMBODIMENTS

Figure 1:
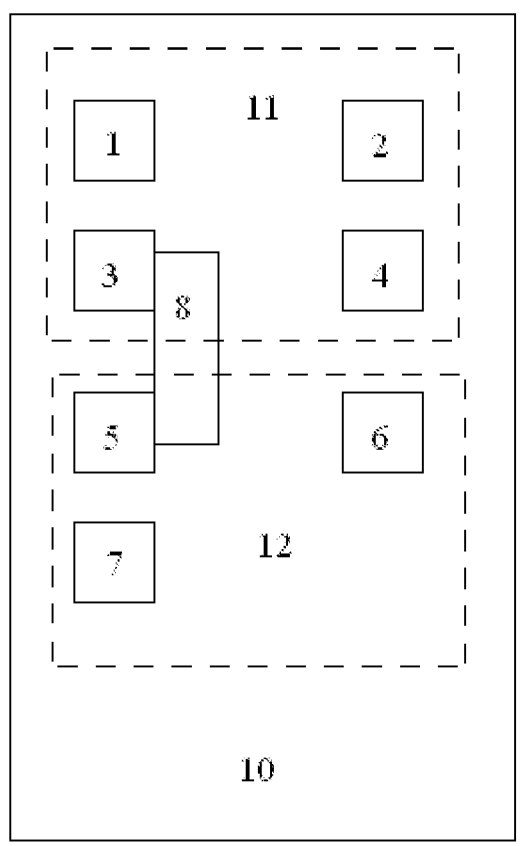
FIG. 1 is a schematic illustration of a typical water heater thermostat unit.

For the purposes of promoting an understanding of the principles of the invention, reference will now be made to the embodiments illustrated in the drawings and specific language will be used to describe the same. It will nevertheless be understood that no limitations of the inventive scope is thereby intended, as the scope of this invention should be evaluated with reference to the claims appended hereto. Alterations and further modifications in the illustrated devices, and such further applications of the principles of the invention as illustrated herein are contemplated as would normally occur to one skilled in the art to which the invention relates.

One embodiment of the present invention is a device that is easily attached to a standard water heater thermostat unit, thereby allowing the standard water heater thermostat to be upgraded and transformed into a device that is responsive to communicated and autonomous signals. One of the main advantages of this embodiment of the present invention is that this upgrade and transformation can be done at minimal cost, and only requires minimal technical skill. This embodiment consists of circuitry that can be easily attached to a typical water heater thermostat using only a screwdriver. This embodiment of the present invention facilitates additional controllability while maintaining the protections provided by the existing water heater thermostats.

As shown in the schematic illustration of FIG. 1, a typical upper water heater thermostat unit 10 has seven electrical terminals that are readily exposed. The upper four terminals, shown in FIG. 1 as terminals 1, 2, 3, and 4, form the high temperature cutoff thermostat 11. The lower three terminals, shown in FIG. 1 as terminals 5, 6, and 7, form the upper regulatory thermostat 12. Terminals 1 and 2 are the AC power inputs for the upper regulatory thermostat 11. Terminals 3 and 4 are the AC power outputs for the upper regulatory thermostat 11. Terminal 5 is the AC power input for the upper regulatory thermostat 12. Terminals 6 and 7 are AC power outputs to the resistive elements that heat the water in the water heater. A typical upper water heater thermostat unit 10 also has a shunt, 8, that forms a connection between terminal 3 and terminal 5.

Figure 2:
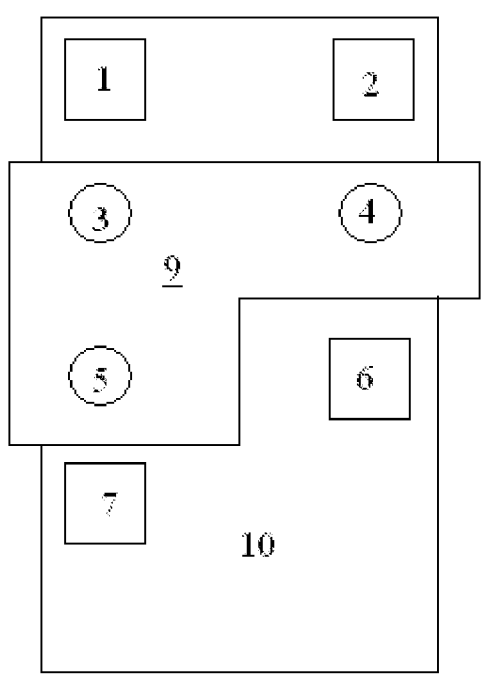
FIG. 2 is a schematic illustration that shows the retrofit embodiment of the present invention where the control module of the present invention is attached to a typical water heater thermostat unit.

The connection between the control module in the retrofit embodiment of the present invention and the terminals of a typical upper water heater thermostat unit 10 is shown in FIG. 2. As illustrated in FIG. 2, the control module 9 includes three electrical connections that line up with terminals 3, 4, and 5 of a typical upper water heater thermostat unit 10 shown in FIG. 1. To install the control module 9, all that is required is that the shunt 8 is removed, and the screws in terminals 3, 4, and 5 are removed, the control module 9 is positioned over the terminals, and then the screws are replaced so that the electrical connections of the control module 9 are now connected to terminals 3, 4, and 5.

Figure 3:
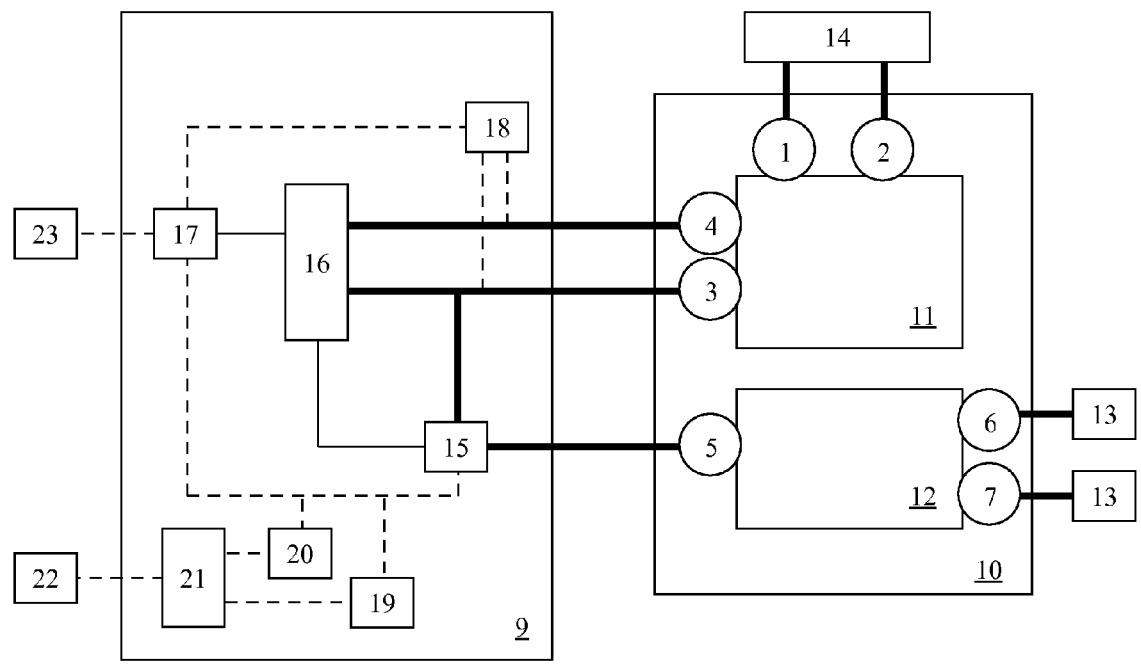
FIG. 3 is a schematic illustration that shows the components of the circuitry that may be used in one embodiment of the control module of the present invention.

The control module 9 further includes the circuitry as shown in FIG. 3. Combined with the electrical connections between the control module 9 and terminals 3, 4, and 5 as shown in FIG. 2, the control module 9 thus forms a switch between terminal 3 and terminal 5. This connection allows the control module 9 to control the output to both the resistive elements through terminals 6 and 7. The circuitry shown in FIG. 3 allows the control module 9 to optimize the operation of the water heater to accommodate a wide variety of considerations.

Preferably, this circuitry includes a switch 15. In the retrofit embodiment shown in FIG. 2, the switch 15 of control module 9 is a hybrid relay. As previously described, the hybrid relay has an electromechanical relay and a semiconductor switch that are electrically in parallel. In this configuration, the semiconductor switch may be configured to close the connection prior to the electromechanical relay, and the electromechanical relay may be configured to open the connection prior to the semiconductor switch. In this manner, control module 9 allows for rapid and frequent switching to maximize the advantages of the advanced controller system while preserving the longevity of the electrical components, such as the electromechanical relay.

As shown in FIG. 3, control module 9 also includes circuitry to control the hot water heater. In the embodiment shown in FIG. 3, the switch 15 of control module 9 is connected to the high temperature cutoff thermostat 11 and the upper regulatory thermostat 12 of the water heater. These connections are made to terminals 3, 4, and 5 as previously described and shown in FIG. 2. Thus, as shown in FIG. 3, the switch 15 of control module 9 is electrically in series with both the high temperature cutoff thermostat 11 and the upper regulatory thermostat 12 of the water heater.

As shown in FIG. 3, the high temperature cutoff thermostat 11 and the upper regulatory thermostat 12 of the water heater are powered by the AC power supply 14. While not meant to be limiting, typically the AC power supply 14 will consist of a hardwired connection in a residential or commercial building.

Control module 9 includes a low voltage power supply 16 that receives AC power from terminals 3 and 4 of the high temperature cutoff thermostat 11 and provides voltage suitable for digital signal processing to microprocessor 17, switch 15 and other digital components of control module 9. As will be recognized by those having ordinary skill in the art of the design of digital circuitry, this is merely one possible configuration. The low voltage power supply 16 could be connected to the digital components of control module 9 in a variety of different configurations, which all would provide the same end result; the provision of low voltage power to the digital components of control module 9. Accordingly, the particular arrangement of the low voltage power supply and other digital components of control module 9 set forth in FIG. 3 is merely intended to illustrate one possible arrangement of these components, and the present invention should in no way be limited to the specific arrangement of the digital components shown in this example.

Control module 9 includes a microprocessor 17 that controls the operation of switch 15 and interfaces with the other digital components of control module 9. As shown in FIG. 3, the microprocessor 17 is in communication with the switch 15 and to the autonomous sensing circuitry 18, the communicated control circuitry 19, and the autonomous and communicated control protocols 20. Additionally, microprocessor 17 may receive information from measurement equipment 23. Examples of measurement equipment 23 include thermostats, thermometers, occupancy sensors, water flow meters, voltmeters, ammeters, and combinations thereof that can measure the temperature of the water in the water heater, the temperature outside, energy consumption patterns, and the voltage and amperage of power consumed by the water heater.

The autonomous sensing circuitry 18 is able to sense signals that include, but are not limited to, sensing the electrical power grid voltage, sensing the electrical power grid frequency, and combinations thereof. Using that information, the microprocessor 17 can be configured to turn the water heater on or off. For example, in a condition where the electrical power grid frequency was below a pre-determined frequency, for example 59.9 Hertz, the autonomous sensing circuitry 18 could send a signal to the microprocessor 17, which would then turn the water heater off.

The communicated control circuitry 19, is connected to a source of communicated signals 22 preferably through electrical isolation circuitry 21. This source of communicated signals 22 these can be any commonly used protocol for transmitting signals, including, without limitation, wireless and wired communications, analogue radio signals, such as AM and FM radio waves, digital signals, such as wireless digital television broadcast signals, digital signals, including those using common communications protocols such as TCP/IP.

Regardless of the specific source of communicated signals 22, the communicated control circuitry 19 is designed to allow communications from the outside world to impact the operation of the water heater. Thus, as an illustrative example and not to be limiting, the communicated control circuitry 19 of the advanced electric water heater controller system of the present invention could receive communicated signals 22 from the electrical power company that indicated that excess electrical power was available as a result of excess wind energy being generated. The communicated control circuitry 19 could then transfer this information to the microprocessor 17 which would then override the current status of the switch 15 and turn the water heater on to take advantage of the excess power available on the grid, and to store that energy in the form of hot water.

Electrical isolation circuitry 21, if used, protects the source of communicated signals 22, which operates at relatively low signal voltages, from exposure to, and potential damage by, the relatively high voltages from the communicated control circuitry 19.

The microprocessor 17 is also connected to circuitry that manages the autonomous and communicated control protocols 20. The circuitry that provides the autonomous and communicated control protocols 20 is further connected to a source of communicated signals 22 that provides data to the water heater. This connection, too, is preferably completed through electrical isolation circuitry 21.

As will be recognized by those having skill in the art, the circuitry that provides the autonomous and communicated control protocols 20 can be configured as a fixed circuit, but is preferably provided either as software or as programmable firmware. Accordingly, the circuitry that provides the autonomous and communicated control protocols 20 can be altered to provide an endless variety of protocols for controlling the hot water heater using the autonomous and communicated controls. For example, and not meant to be limiting, the communicated control protocols 20 and processor 17 can jointly enact different protocols for different times of day, or different protocols for different communicated or autonomous signals, or combinations thereof. Further, these protocols can give primacy to any of the signals (communicated, autonomous, or otherwise) that are input into the control module 9 for controlling the water heater, and can include complex hierarchical decision making algorithms that account for all the variables that the control module 9 may encounter, and give primacy to any number of combinations of those considerations. Accordingly, the control module 9 of the present invention is able to optimize the operation of the water heater to accommodate a wide variety of considerations, as previously described.

While the invention has been illustrated and described in detail in the drawings and foregoing description, the same is to be considered as illustrative and not restrictive in character. Only certain embodiments have been shown and described, and all changes, equivalents, and modifications that come within the spirit of the invention described herein are desired to be protected. Any experiments, experimental examples, or experimental results provided herein are intended to be illustrative of the present invention and should not be considered limiting or restrictive with regard to the invention scope. Further, any theory, mechanism of operation, proof, or finding stated herein is meant to further enhance understanding of the present invention and is not intended to limit the present invention in any way to such theory, mechanism of operation, proof, or finding.

Thus, the specifics of this description and the attached drawings should not be interpreted to limit the scope of this invention to the specifics thereof. Rather, the scope of this invention should be evaluated with reference to the claims appended hereto. In reading the claims it is intended that when words such as "a", "an", "at least one", and "at least a portion" are used there is no intention to limit the claims to only one item unless specifically stated to the contrary in the claims. Finally, all publications, patents, and patent applications cited in this specification are herein incorporated by reference to the extent not inconsistent with the present disclosure as if each were specifically and individually indicated to be incorporated by reference and set forth in its entirety herein.

The invention claimed is:

1. An advanced electric water heater control system comprising:
   a. a high temperature cut-off thermostat having a first and a second AC power input and a first and a second AC power output and an upper regulating thermostat having an AC power output controlling the current to at least one resistive element in an electric water heater,
   b. a control module electrically connected to the first AC power output of said high-temperature cut-off thermostat, the second AC power output of said high temperature cut-off thermostat, and the AC power input of the upper regulating thermostat,
   c. said control module including a switch to open or close the electrical connection between the first AC power output of said high-temperature cut-off thermostat and the AC power input of the upper regulating thermostat,
   d. circuitry configured to control said switch in response to a signal selected from the group of an autonomous signal, a communicated signal, and combinations thereof.

2. The advanced electric water heater control system of claim 1 wherein the control module is a retrofit component that is connected to the high temperature cut-off and upper regulating thermostat of an existing thermostat of an electric water heater.

3. The advanced electric water heater control system of claim 2 wherein the connection between the control module and the first AC power output of the high-temperature cut-off thermostat, the second AC power output of the high temperature cut-off thermostat, and the AC power input of the upper regulating thermostat of the existing thermostat of an electric water heater is made by positioning the corresponding three connections of the control module to align with corresponding connections of the high temperature cut-off and upper regulating thermostats and completing the electrical connection using the existing screw terminals of the thermostat connections.

4. The advanced electric water heater control system of claim 1 wherein the control module has been integrated with the high temperature cut-off and upper regulating thermostat as a unified component.

5. The advanced electric water heater control system of claim 1 wherein said switch is a hybrid relay, having an electromechanical relay and a semiconductor switch electrically in parallel, wherein the semiconductor switch is configured to close the connection prior to the electromechanical relay, and the electromechanical relay is configured to open the connection prior to the semiconductor switch.

6. The advanced electric water heater control system of claim 1 wherein the circuitry is configured to allow the communicated signal to override the current status of the switch.

7. The advanced electric water heater control system of claim 1 wherein the control module contains circuitry that electrically isolates the communicated signal from the first and second AC power inputs.

8. The advanced electric water heater control system of claim 1 further comprising at least one additional electronic thermostats that measure the temperature of water in at least one location in the electric water heater.

9. The advanced electric water heater control system of claim 8 wherein the circuitry configured to control the switch in response to an autonomous signal, communicated signal, or combination thereof, is configured to be modified by the measured water temperature.

10. The advanced electric water heater control system of claim 1 wherein the circuitry configured to control the switch has predetermined protocols and the protocols are further configured to respond to the communicated signal and the autonomous signal.

11. The advanced electric water heater control system of claim 1 wherein the autonomous signal is selected from the group of sensing the electrical power grid voltage, sensing the electrical power grid frequency, and combinations thereof.

* * * * *